May 27, 1952  S. RAPPAPORT ET AL  2,597,949
BUOYANCY SCALE
Filed July 7, 1949  5 Sheets-Sheet 2

INVENTORS
SIGMUND RAPPAPORT AND
JAMES C. PETREA
BY
Baron + Thomas
ATTORNEYS

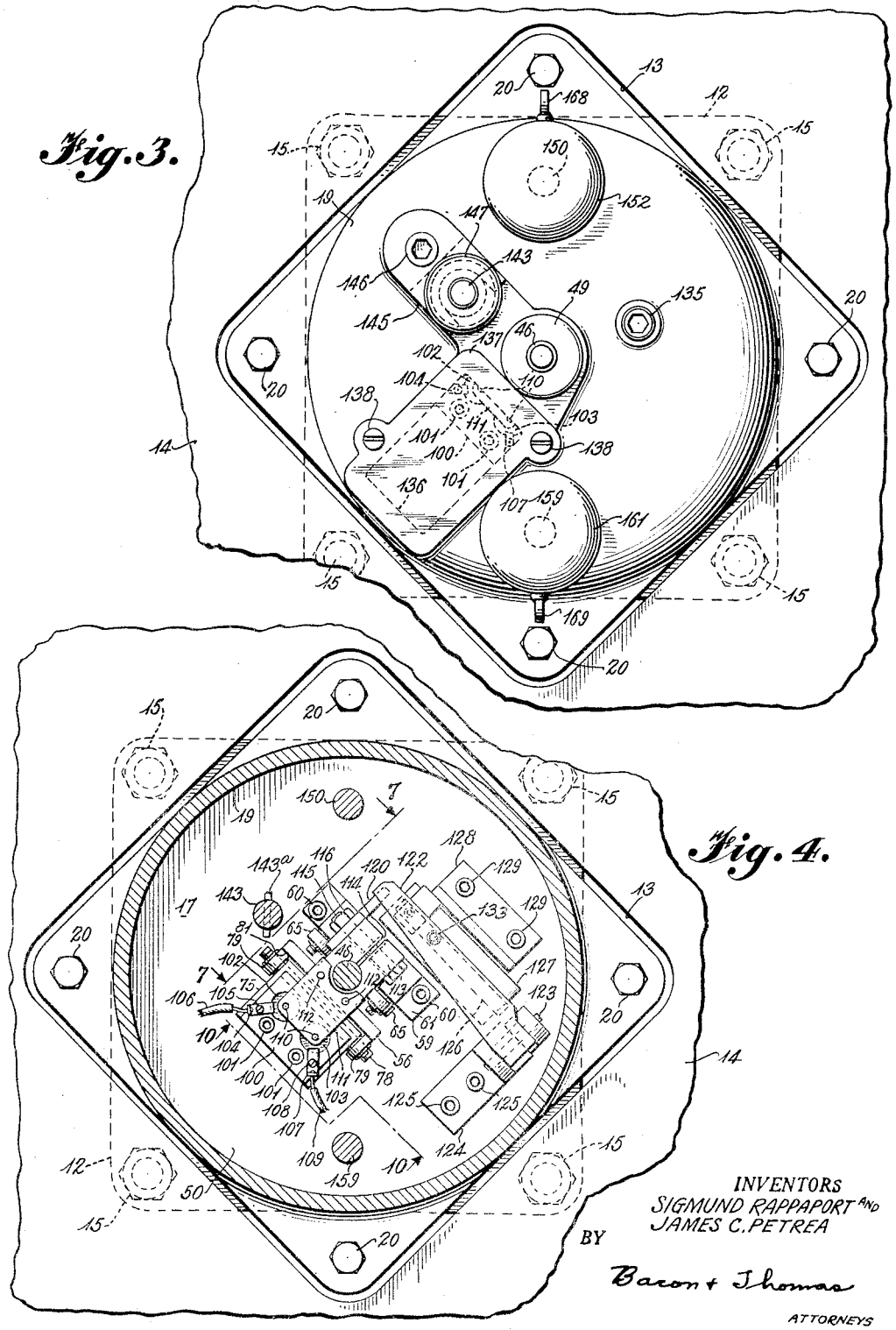

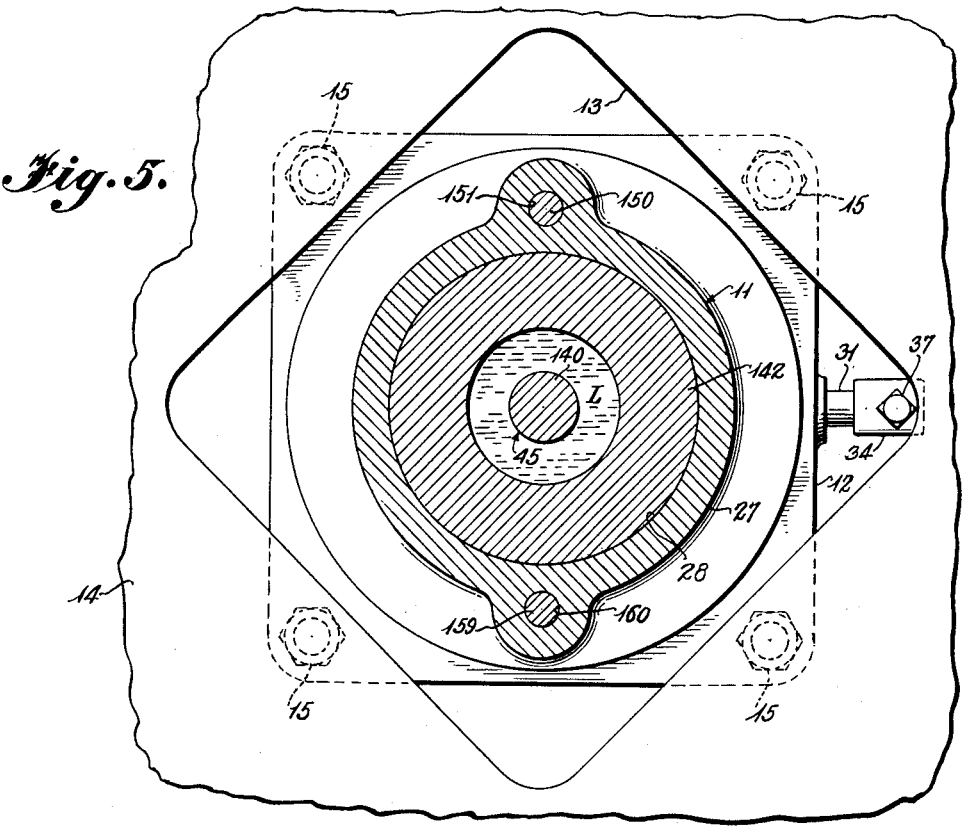
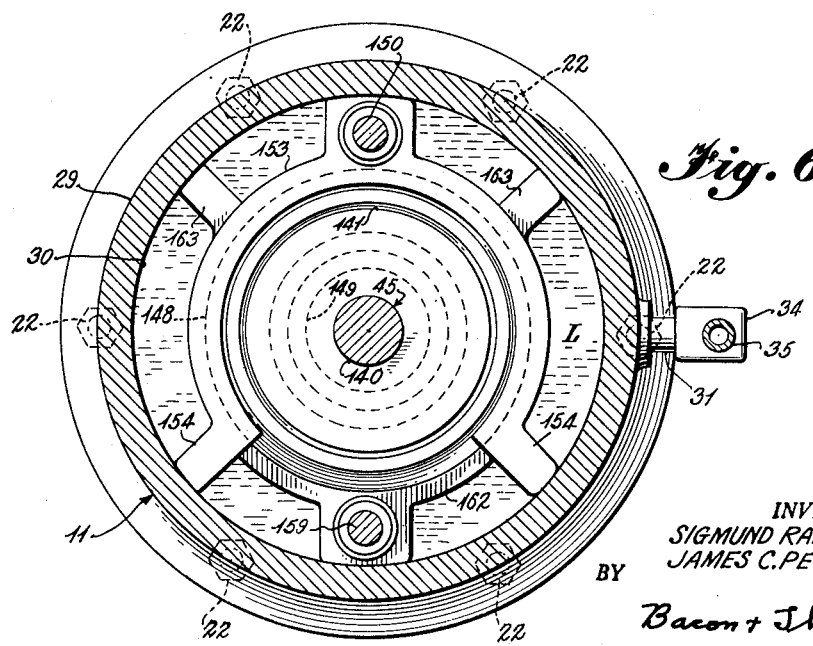

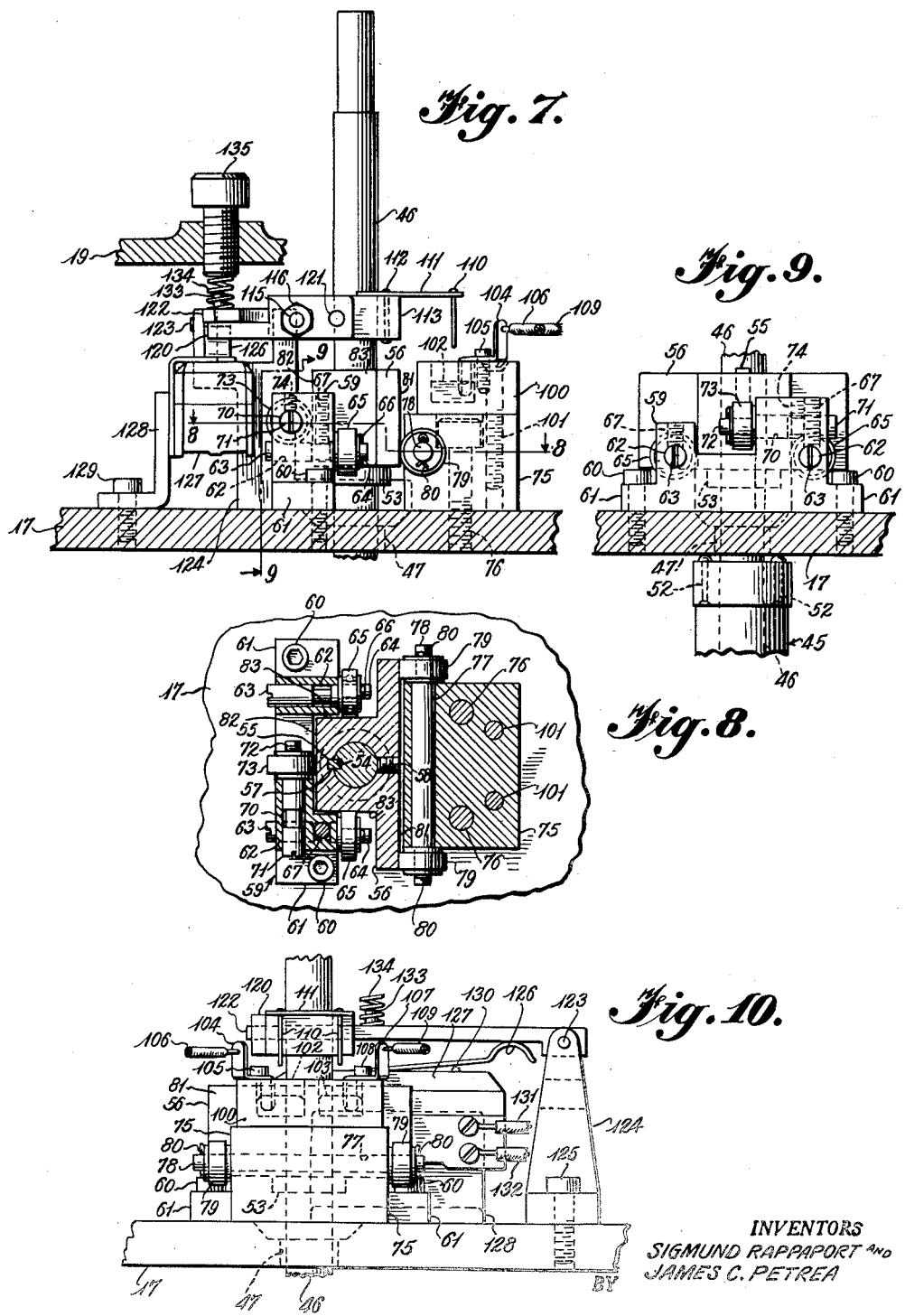

Patented May 27, 1952

2,597,949

UNITED STATES PATENT OFFICE 2,597,949

BUOYANCY SCALE

Sigmund Rappaport and James C. Petrea, Durham, N. C., assignors to Wright Machinery Company, Durham, N. C., a corporation of North Carolina Application July 7, 1949, Serial No. 103,497

23 Claims. (Cl. 265—43)

1

The present invention relates to weighing machines, and more particularly to weighing machines of the liquid displacement type, that is, machines wherein weighing is effected by float-displacement of a given volume of liquid.

The speed at which a liquid displacement or hydraulic type scale can be operated for weighing successive loads depends largely upon its oscillating time, i. e., the time required for one complete weighing cycle. The total weighing time for each load is, of course, determined by the time required for introducing the material into the receiver, plus the time required for the float to be depressed after the desired weight has been made, plus the time required for discharging the weighed material from the receiver, plus the time required for the receiver to be restored to material-receiving position (the float meanwhile having returned to the position it occupied at the beginning of the weighing cycle). It is, therefore, highly desirable to have an oscillating time as short as possible in order to increase the speed at which successive loads can be weighed. The oscillating time, of course, will also depend upon the liquid medium displaced, the magnitude of the load to be weighed, the weight of the float, etc., and the desired degree of sensitivity or accuracy of the machine. Inasmuch as the oscillating time decreases as the specific gravity of any given liquid medium increases, it is desirable to use a liquid medium that has a high specific gravity, for instance, mercury, in lieu of other mediums such as oil, water, etc. Mercury has a specific gravity of 13.58 at 60° F., which is over 13 times greater than that of either water or oil.

The oscillation characteristics of the present weighing machine can be expressed mathematically, but a discussion of the theory and mathematical relationships involved is not deemed necessary to an understanding of the invention and, therefore, has been omitted.

The principal object of the invention is to provide a high speed, displacement type weighing machine which is adapted to be readily and quickly adjusted for weighing different loads of material.

Another object of the invention is to provide a weighing machine wherein the size and movements of the parts are reduced to a minimum so that rapid and accurate weighing can be effected.

Another object of the invention is to provide a weighing machine in which no movement of the parts occurs until the buoyant force opposing movement of the parts is overcome by the deposit of the desired weight of material in the receiver.

A further object of the invention is to provide

2 a weighing machine which is rapid, highly accurate, and free from all tendency to hunt.

A further object of the invention is to provide a weighing machine of the liquid displacement type wherein the buoyant effect of the float means can be varied at will over a considerable range.

A further object of the invention is to provide a weighing machine including manually operable means for varying the buoyant effect of the float means, at will.

A further and more specific object of the invention is to provide a weighing machine adapted to weigh predetermined loads falling anywhere within the range of 1 to 5 pounds, although it is to be understood that the invention is not limited to a weighing machine of any particular capacity range.

A still further object of the invention is to provide a weighing machine of variable capacity which is adapted to be fed by hand and/or incorporated in any automatic weighing machine, for example, a machine of the character disclosed in the copending application of Luther W. Aldridge, Serial No. 34,188.

Other objects and advantages of the invention will be apparent from the following description taken in conjunction with the accompanying drawings, in which:

Fig. 3 is a plan view of the weighing machine with the receiver and its support removed;

Fig. 4 is a horizontal sectional view of the weighing machine taken on the line 4—4 of Fig. 1;

Fig. 5 is a similar sectional view taken on the line 5—5 of Fig. 1;

Fig. 6 is a horizontal sectional view taken on the line 6—6 of Fig. 1;

Fig. 7 is an elevational view of certain parts of the machine as viewed in a plane represented by the line 7—7 of Fig. 4;

Fig. 8 is a horizontal sectional view taken on the line 8—8 of Fig. 7;

Fig. 9 is a sectional view taken on the line 9—9 of Fig. 7; and

Fig. 10 is an elevational view of certain details of the machine as viewed in a plane represented by the line 10—10 of Fig. 4.

Figure 1:
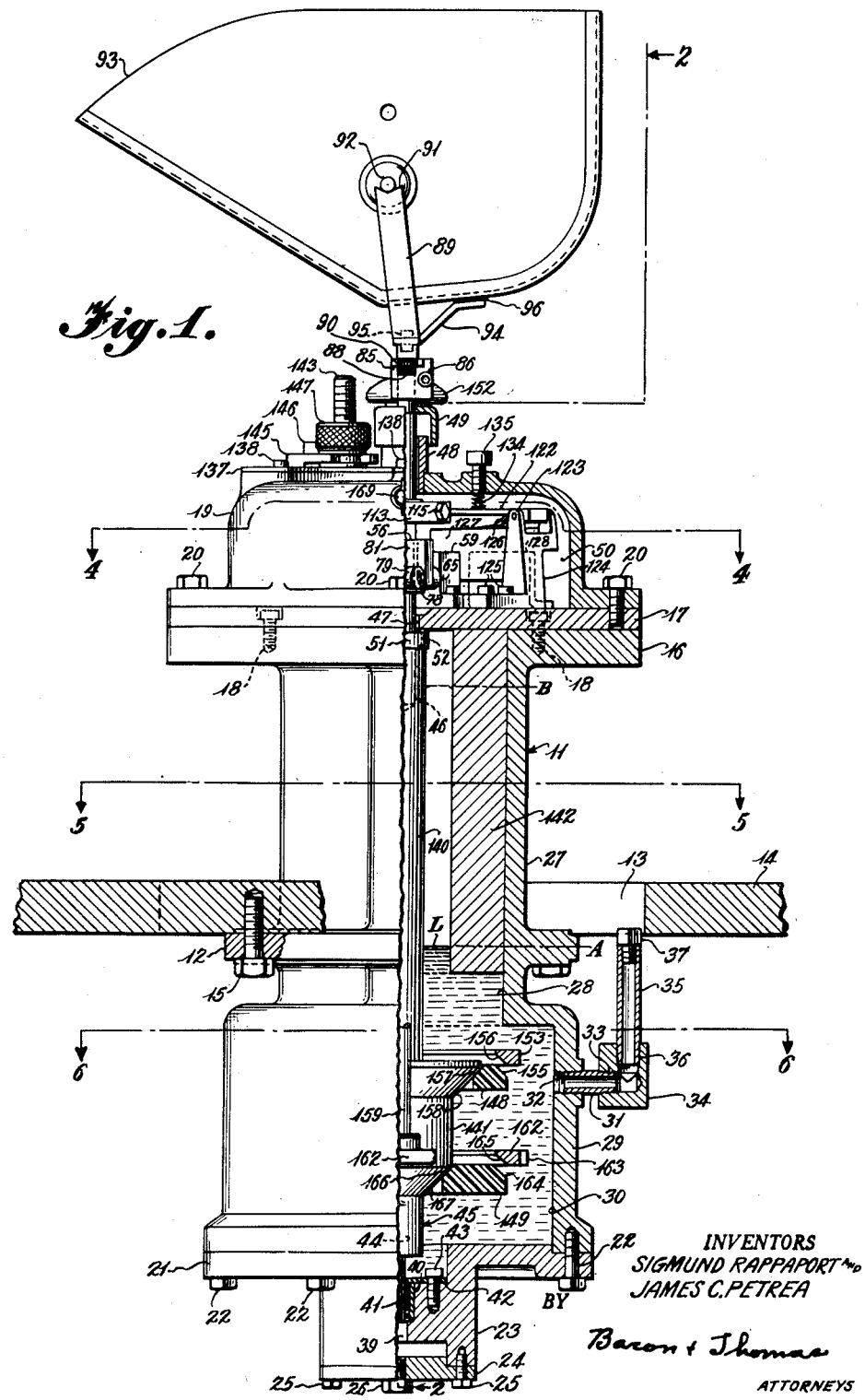
Fig. 1 is a front elevational view, partly in section, of a weighing machine embodying the principles of the present invention.
Figure 2:
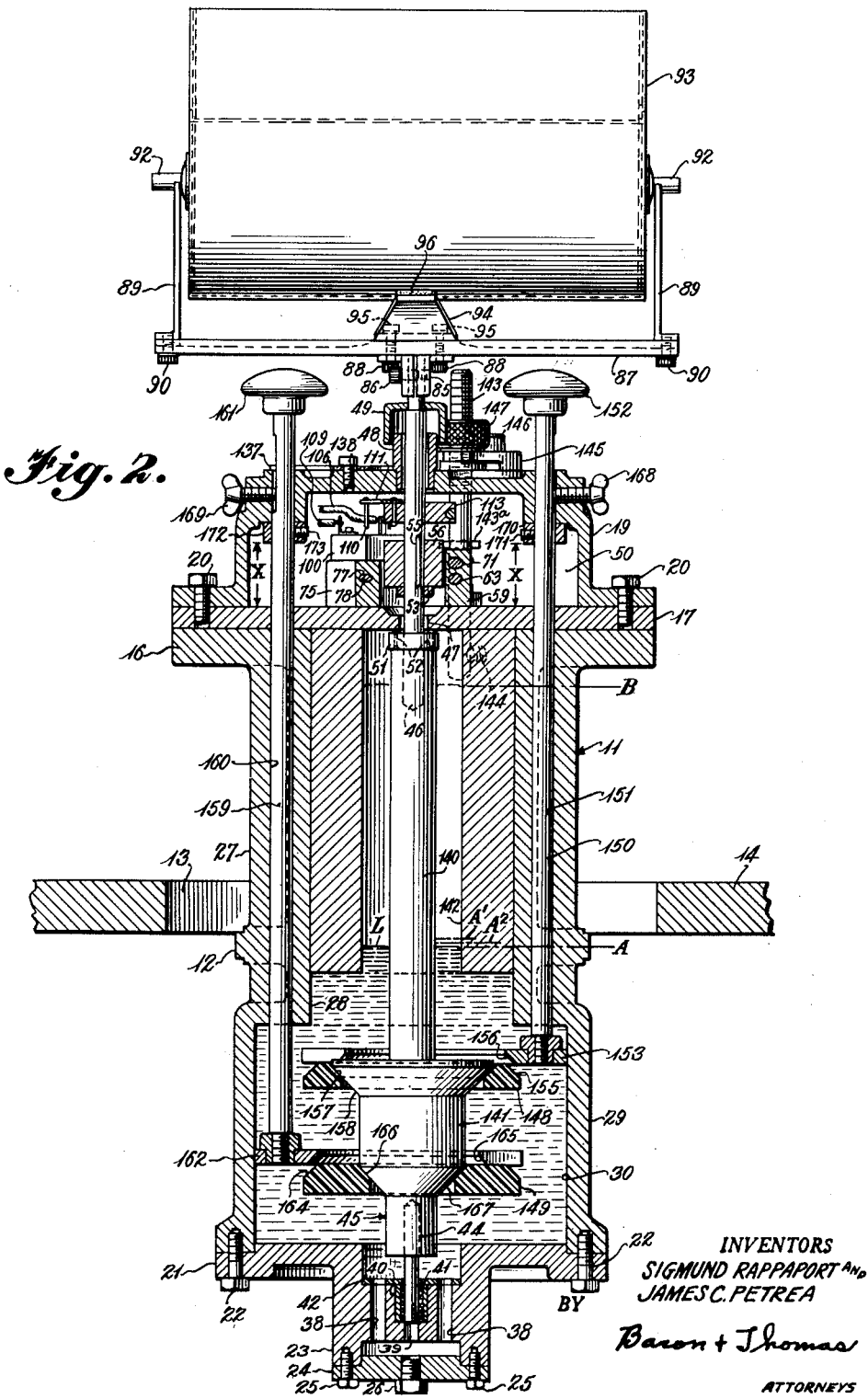
Fig. 2 is a vertical sectional view through the weighing machine, as viewed on the line 2—2 of Fig. 1.

Referring now more particularly to Figs. 1 and 2 of the drawings, the weighing machine comprises an elongated cylindrical housing or tank 11 having a flange 12, which is substantially square in contour, projecting horizontally therefrom at a point approximately medially of its height. The housing 11 extends through a substantially square opening 13 formed in a bed plate 14, the corners of the flange 12 being disposed intermediate the corners of the opening 13, as is best shown in Fig. 3. A plurality of cap screws 15 extend through the flange 12 and into threaded openings in the bed plate 14 to securely mount the housing 11 on the bed plate 14.

The housing 11 also has a substantially square flange 16 at its upper end with the corners thereof staggered 45° with respect to those of the flange 12. The square opening 13 is slightly larger than the flange 16 to permit the passage of said flange upwardly therethrough during the assembly of the housing 11 with the bed plate 14. A square plate 17 is secured to the flange 16 by a plurality of countersunk cap screws 18 and a cover 19 is mounted upon the plate 17 by a plurality of cap screws 20. The lower end of the housing 11 is closed by an end plate 21 secured to the lower end face of the housing 11 by a plurality of cap screws 22. The end plate 21 has a depending cylindrical boss 23, which in turn has a plate 24 secured thereto by a plurality of screws 25. A drain plug 26 is mounted in a threaded opening located centrally of the plate 24.

The housing 11 includes an upper portion 27 provided with an internal bore 28, and a relatively enlarged lower portion 29 provided with an internal bore 30 larger in diameter than the bore 28. A horizontal pipe nipple 31 has one end thereof threaded into an opening 32 formed in the lower cylindrical portion 29 and its other end is threaded into an opening 33 in a pipe fitting 34. The lower end of a vertical filler pipe 35 is threaded into an opening 36 in the fitting 34, and a plug 37 is threaded into the upper end of the filler pipe 35. The liquid medium L by means of which weighing is effected is introduced into the housing 11 through the filler pipe 35 and assumes a level indicated by the letter A when the parts are in the positions shown. This liquid medium may be oil or any other suitable medium, but for the purpose of the present invention it is preferred to employ mercury in view of its favorable viscosity and high specific gravity. The boss 23 on the lower end plate 21 is provided with a plurality of vertical passageways 38, Fig. 2, for a purpose which will be explained later.

The boss 23 on the lower end plate 21 is provided with a central opening 39 which is enlarged as indicated at 40 to receive a conventional ball bushing 41. The bushing 41 is retained in the enlarged portion 40 by a clamping plate 42 held in place by a plurality of cap screws 43. A pin 44 is securely mounted in the lower end of a main float generally identified by the numeral 45 and is slidably received in the bushing 41. An extension rod 46 is securely mounted in the upper end of the main float 45 and extends through an opening 47 formed in the plate 17. The rod 46 also extends through a dust sleeve 48 mounted on the cover 19 and carries a dust cover 49 adjacent its upper end, disposed in telescoping relation with the dust sleeve 48. The purpose of the dust sleeve 48 and dust cover 49 is, of course, to prevent all foreign matter from entering a chamber 50 jointly formed by the cover 19 and the plate 17. The rod 46 has an enlargement 51 which is engaged with the upper extremity of the float 45 and carries a plurality of rivets 52 arranged so that the heads thereof are adapted to engage with the lower side of the plate 17 to limit upward movement of the float 45 and to prevent sticking of the enlargement 51 to the plate 17 due to surface tension.

The rod 46 has a rubber washer 53 disposed above the plate 17. The rod 46 is provided with a keyway 54, Fig. 8, immediately above the washer 53 adapted to receive a key 55. A cross or guide member 56 is disposed above the rubber washer 53 and is provided with a slot 57 to receive the key 55, so that the keyway 54 prevents relative rotation between the guide member 56 and the float extension rod 46. The guide member 56 is prevented from moving vertically relative to the pin 46 by a set screw 58. The rubber washer 53 is adapted to be maintained in engagement with the plate 17, as by holding down the float extension 46 (by any suitable means, not shown) to provide a seal for preventing the mercury L from spilling through the opening 47 while the machine is in transit. During normal use of the machine the guide member 56 guides the upper end 46 of the main float 45 for free vertical movement through its association with anti-friction means which will now be described.

A bracket 59 (best shown in Figs. 7 to 9) is secured to the plate 17 by screws 60 extending through flanges 61 at the opposite ends thereof. The bracket 59 is provided with parallel openings 62 for the reception of studs 63, each of which has an end portion 64 eccentric with the remainder thereof. A small conventional ball bearing or roller 65 is mounted upon the eccentric portion 64 of each of the studs 63 and is retained thereon by a cotter pin 66. The studs 63 are held in angularly adjusted position and against longitudinal movement by set screws 67. The bracket 59 is further provided with an opening 70 disposed at right angles to the opening 62 for the reception of a stud 71 having an eccentric end portion 72. A roller 73, also in the form of a conventional ball bearing, is suitably mounted upon the eccentric portion 72 of the stud 71. A set screw 74 holds the stud 71 in adjusted angular position and prevents longitudinal movement thereof.

A second bracket 75 (best shown in Figs. 7, 8 and 10) is mounted upon the plate 17 by a pair of countersunk cap screws 76. The bracket 75 has a passageway 77 extending horizontally therethrough in which a shaft 78 is received. Rollers 79 in the form of conventional roller bearings, similar to the rollers 65 and 73, are mounted upon the shaft 78 at the opposite ends of the bracket 75 and are retained thereon by cotter pins 80. The rollers 79 engage a vertical face 81 on the guide member 56 and the roller 73 engages an opposite parallel face 82 of said guide member. The rollers 65 engage a pair of parallel faces 83 also formed on the guide member 56, but arranged perpendicular to the plane of the faces 81 and 82. Thus, the roller 73 and the rollers 79 cooperate with the guide member 56 to prevent movement thereof in one direction and the rollers 65 cooperate with the guide member 56 to prevent movement thereof in a direction at right angles thereto. The eccentric studs 63 and 71 make it possible to adjust the rollers 65 and 73 to eliminate all excess play between the same and the guide 56. The use of ball bearings as the guide rollers 65, 73 and 79 reduces frictional resistance to movement of the upper end of the main float 45 to a minimum, and the ball bushing 41 likewise reduces frictional resistance to movement of the lower end of said float to a minimum, thus providing for free, guided vertical movement of the float.

A bracket 85 (Figs. 1 and 2) is secured to the upper end of the rod 46 by means of a screw 86, and a horizontal support 87 is secured to the bracket 85 by screws 88. An upright member 89 is disposed at each end of the support 87 and is secured thereto by a screw 90. The upper ends of the uprights 89 are provided with a notch 91 as best shown in Fig. 1, and these notches are each adapted to receive a trunnion 92 projecting laterally from an end wall of a receiver 93 into which the material to be weighed is deposited, either by hand, or by automatic feeding means such as disclosed in the Aldridge application, supra. Clockwise rotation of the receiver 93 about its trunnions 92, as viewed in Fig. 1, is prevented by a stop member 94 secured at one end by screws 95 to the support 87 and carrying a pad 96 at its opposite end which engages the bottom of the receiver 93.

It will be apparent from Figs. 1 and 2 that the liquid mercury L in the housing 11 buoyantly supports the weight of the receiver 93, its support 87, the main float 45, etc., as well as the weight of any material deposited in the receiver, up to the point at which the buoyant effect of the liquid is overcome. Whereupon the entire assembly will start to move downwardly against the buoyant force of the liquid. Any liquid displaced by downward movement of the pin 44 at the lower end of the float 45, as an incident to a weighing operation, readily flows through the passageways 38 from the space in the boss 23 at the lower end of said passageways into the bore 30, and vice versa when the pin 44 rises after the load is dumped from the receiver 93. The passageways 38 also facilitate draining of the housing 11 when the plug 26 is removed. In the present machine, the maximum downward movement of the float mechanism is very small, being only about $\frac{5}{16}$ of an inch, so that no appreciable turbulence is set up in the liquid and weighing of successive loads can be made rapidly.

As has been indicated hereinbefore, the material to be weighed may be fed to the receiver 93 by any suitable mechanical feeding means, for example, feeding means as shown in the Aldridge application, supra, and to this end the present machine includes control means whereby the feeding of the material can be automatically interrupted after a predetermined weight of material has been deposited in the receiver 93. Such control means will be described in detail later.

In addition to mechanical feeding of material into the receiver, the present machine is adapted to be further automatically controlled, as by association with any suitable means for automatically effecting dumping of the receiver 93 after a given predetermined weight has been made; a suitable dumping mechanism for such purpose also being disclosed in the Aldridge application, supra. The control means for effecting automatic dumping of the receiver 93 will also be described in detail later.

In an automatic weighing machine, it is highly desirable that the feed of the material to the receiver 93 be interrupted immediately that the predetermined weight of material has been deposited into the receiver, and that the loaded receiver be promptly discharged thereafter. Both of these functions can be readily accomplished through the use of electrically operated means which will substantially simultaneously disable the feeding mechanism upon making of the predetermined weight and effect dumping of the loaded receiver.

A block of micarta or other suitable electrical insulating material 100 (see Figs. 4 and 7) is adapted to be mounted upon the bracket 75 by a plurality of screws 101. The block 100 contains two pockets, each partially filled with an electrical conducting medium, such as mercury, whereby to provide two mercury pools 102 and 103. A contact 104 extends into the mercury pool 102 and is secured to the block 100 by a screw 105, a conductor 106 being soldered or otherwise secured to said contact. A similar contact 107 extends into the mercury pool 103 and is secured to the block 100 by a screw 108, a conductor 109 being soldered or otherwise secured to the contact 107.

Two pieces of wire 110 are carried by a piece of sheet copper 111, which is secured by rivets 112 to a block of insulating material 113 associated with the rod 46. The wires 110 and copper sheet 111 serve as a bridge for interconnecting the mercury pools 102 and 103. The insulating block 113 is slotted on the side of the rod remote from the plate 111 as indicated at 114 in Fig. 4, and a bolt 115 extends through the block 113, bridging the gap 114 so that when a nut 116 on the bolt 115 is tightened, the block 113 will be securely clamped to the rod 46 and will move therewith. Obviously, the height of the block 113 can be varied with respect to the level of the mercury in the pools 102 and 103 in order to vary the extent of downward movement of the rod 46 required to complete the circuit across the two mercury pools.

A finger 120, Fig. 7, is secured to the block 113 by the bolt 115 and constrained against rotation relative to said bolt by a pin 121 extending through said finger into said block. The finger 120 extends beyond the block 113 and is disposed below one end of a switch actuating arm 122 which has its opposite end pivotally mounted upon a pin 123 supported by a bracket 124. The base of the bracket 124 is secured to the plate 17 by screws 125. The arm 122 is disposed directly above and engaged with a spring 126 forming part of a conventional, normally closed "Micro" switch 127. The switch 127 is suitably supported by a bracket 128 which, in turn, is fastened to the plate 17 by screws 129. The switch 127 includes the usual operating pin 130 (Fig. 10) and has conductors 131 and 132 connected thereto. These conductors are adapted to be connected with automatic, electrically controlled feeding means (not shown herein, but which may be of the character disclosed in the Aldridge application, supra) for feeding the material to be weighed to the receiver 93.

The arm 122 carries a short upright post 133 which serves to position a light compression spring 134 thereon. The spring 134 is disposed directly below a screw 135 adjustably mounted in the cover 19 for varying the spring pressure effective on the arm 122. The spring 134 normally urges the arm 122 downwardly into contact with the finger 120, the latter preventing the arm 122 from assuming a position in which it can actuate the spring 126 to depress the pin 130 for effecting opening of the switch 127 and interruption of the feed, until a predetermined weight of material has been deposited in the receiver 93 and the rod 46 has moved downwardly a predetermined distance. It will be understood that as the rod 46 moves downwardly, the finger 120 will move downwardly with it, thereby lowering the support for the free end of the arm 122 so that said arm can swing downwardly about its pivot 123 under the influence of the spring 134 the slight distance necessary to actuate (open) the switch 127. The downward movement of the rod 46 will occur as the material deposited in the receiver 93 reaches the desired weight, which is sufficient to overcome the buoyant effect of the float 45 and cause said float to move downwardly in the liquid L.

The conductors 106 and 109 associated with the mercury pools 102 and 103, respectively, are adapted to be connected in circuit with a solenoid switch (not shown) for controlling the operation of a dumping mechanism (not shown herein, but which may be of the character disclosed in the Aldridge application, supra) for discharging the weighed load from the receiver 93. The operation of the machine is such that the bridge means, comprising the wires 110 and plate 111, is lowered incidental to the downward movement of the rod 46, to electrically interconnect the mercury pools 102 and 103 to complete the circuit to the dumping mechanism (not shown) at substantially the same time that the feed control switch 127 is opened, so that feeding of material to the receiver 93 is interrupted, and the contents of the receiver dumped immediately after the feed has been interrupted. Of course, after the contents of the receiver have been dumped, the buoyant force of the liquid L causes the float 45 and its associated rod 46, etc., to rise so that the feeding of material to the receiver 93 will be resumed immediately that the finger 120 raises the arm 122 to a position where the feed control switch 127 is closed and the circuit to the feeding means (not shown) is again completed. It will be understood, of course, that the dumping circuit is also interrupted as the float 45 rises and the wires 110 break contact with the mercury pools 102 and 103, but that the dumping mechanism (not shown) is such that it restores the receiver 93 to its material-receiving position before the feeding of material thereinto is resumed.

The condition of the mercury pools 102 and 103 and of the wires 110 can be observed at all times through an opening 136 in the cover 19, as best shown in Fig. 3. A transparent window 137 of "Lucite" or other suitable material overlies the opening 136 and is secured in place by screws 138 threaded into the cover 19. Mercury can be initially introduced through the opening 136 to form the pools 102 and 103 by removing the window 137.

The aforedescribed weighing cycle can be repeated in rapid succession and successive loads weighed with great accuracy. The float 45 can be designed in conjunction with other parts of the machine so that it has a buoyant effect equal to the dead weight of the empty receiver 93, the receiver support means 87, 89, etc., plus one pound, when the liquid level is at A, as will be explained hereinafter. Hence, the successive weighed loads will be one pound.

Irrespective of whether the material to be weighed is fed to the receiver 93 manually, or mechanically under automatic control, one of the very important features of the instant automatic weighing machine is its adaptability for weighing various loads of material covering a fairly wide range, for example, loads of 1, 2, 3, 4, or 5 pounds, or fractional loads lying between any of the specified pound loads. Means whereby the capacity of the weighing machine can be quickly varied to weigh fixed loads within the above range will now be described.

The float 45 (Fig. 2) includes an upper cylindrical portion 140 of uniform diameter and an enlarged spool-like lower portion 141 having zones of different diameters. The length of the float portion 140 between the levels indicated by the letters A and B is sufficient to displace liquid L equivalent in weight to one pound. In order to increase the capacity of the weigher from one pound to two pounds, or to any fractional pound weight between one pound and two pounds, an annular displacement member 142 is disposed concentrically within the bore 28 of the housing portion 27 in sliding contact with said bore. The displacement member 142 surrounds the float portion 140 and is connected at its upper end to a vertical stem 143. The lower end of the stem 143 is secured to the displacement member 142 by a set screw 144. The stem 143 projects through aligned openings in the plate 17 and housing 19 to a point a substantial distance above said housing and is threaded at its outer end. A yoke 145 is mounted upon the housing 19 and is held in place thereon by a screw 146. A knurled nut 147 is engaged with the threaded portion of the stem 143, wherefrom it will be apparent that said knurled nut can be manipulated to effect raising or lowering of the displacement member 142 relative to the liquid L in the housing 11. As the displacement member 142 is lowered in the housing chamber 28, it will correspondingly displace the mercury L contained therein causing the level thereof to rise, from level A toward level B to increase the buoyant effect of the liquid opposing downward movement of the main float 45. A pin 143a is mounted on the stem 143 and is adapted to engage with the upper side of the plate 17 to limit the maximum downward movement of the displacement member 142. The dimensions of the displacement member 142 may be such that when said member is lowered to its maximum depth it will raise the liquid level to the level B, displacing exactly one pound of mercury to thereby increase the capacity of the weighing machine from one pound to two pounds. It will be recalled that the float portion 140 between levels A and B is such as to displace one pound of mercury so that the total buoyant effect of the float 45 would then be two pounds, thus enabling two-pound loads to be successively weighed by the machine. Manifestly, load increments of a fraction of a pound can be obtained at any time by merely adjusting the displacement member 142 to the necessary intermediate position to increase the buoyant effect of the float means by the desired number of ounces. However, it is preferable to design the displacement member 142 so that its maximum displacement is several ounces in excess of one pound for the reasons that it is difficult to maintain the liquid level at an exact point, and temperature changes affect the total buoyancy due to the differential in thermal expansion of the float material and the liquid. The correct position of the displacement member 142 will, in either event, be determined by placing a known weight in the receiver 93 and regulating the nut 147 until tripping of the switch 127 occurs at the right displacement point of the float 45. The pin 143a will at all times prevent lowering of the displacement member 142 to a depth where it would be engaged by the lower spool portion 141 of the float 45 and interfere with its free movement.

Further weighing capacity is provided through the provision of a pair of auxiliary float rings 148 and 149, which are disposed in the housing chamber 30 in association with the enlarged spool portion 141 of the main float 45. A rod 150 is slidably mounted in a passageway 151 in the housing 11, said rod extending through the plate 17 and through the housing 19 and having a knob 152 at its upper end. The lower end of the rod 150 is secured to a generally horseshoe-shaped member 153 provided with radial lugs 154, Fig. 6, for guiding the same in the chamber 30. The ring 148 is disposed below the member 153 and has its upper outer corner chamfered as indicated at 155 (Figs. 1 and 2) and is adapted to be engaged by a similarly chamfered portion 156 formed on the member 153 to automatically center the two when engaged. The upper inner corner of the ring 148 is beveled or chamfered as indicated at 157 and is adapted to engage a complemental beveled surface 158 on the float portion 141 to center the ring 148 relative to the main float 45 upon engagement therewith so that its thrust will be straight up and not biased.

A second rod 159 of greater length than the rod 150 is slidably disposed in a passageway 160 formed in the housing 11 and is provided with a knob 161 at its upper end. The rod 159 is connected to a generally horseshoe-shaped member 162 at its lower end similar to the member 153, and provided with radially extending lugs 163 (Fig. 6) for maintaining the same centralized in the chamber 30. The ring 149 is disposed below the member 162 and its upper outer corner is beveled as indicated at 164 and is adapted to engage with a complemental surface 165 on the member 162 to automatically align the two when engaged. The upper inner corner of the ring 149 is beveled as indicated at 166 and is adapted to engage a similar beveled surface 167 on the float portion 141 to automatically center the two when engaged so that the thrust of the ring 149 will be straight up and free from lateral bias.

The knob 152 is adapted to be manually engaged for effecting vertical movement of the rod 150, a wing bolt 168 being mounted in the housing 19 for locking the rod 150 in adjusted position. The rod 159 is adapted to be similarly manually adjusted and to be locked in adjusted position by a wing bolt 169. A collar 170 (Fig. 2) is secured to the rod 150 by a set screw 171 and a collar 172 is secured to the rod 159 by a set screw 173. The collars 170 and 172 limit the downward movement of the rods 150 and 159, respectively, to the dimension X, a distance of about 1", said collars engaging the housing 19 when said rods are in their fully raised positions and engaging the plate 17 when in their fully lowered positions. In normal use, the respective rods 150 and 159 are either in their fully raised or fully lowered positions and never in an intermediate position. If both rods 150 and 159 are lowered the liquid level will be caused to rise from A to A' (Fig. 2), and if only one rod is lowered the liquid level will rise only to $A^2$. The slight incremental increase in the height of the liquid level resulting from lowering the respective rods 150 and 159 is the same for both in view of the fact that they are of equal diameter and are lowered exactly the same distance X. Hence, the lowering of either rod will displace a constant volume of liquid thereby providing a slight buoyant effect on the float 45, which buoyant effect, for convenience in discussion, will be designated K. The buoyant effect K thus produced is compensated for by proper dimensioning of the auxiliary float rings 148 and 149, and by designing the float 45 so that when the liquid level is at A the buoyant effect thereof is one pound minus 2K. Hence, when the liquid level is at A' the buoyant effect of the float 45 is one pound.

The auxiliary float rings 148 and 149 are buoyantly supported by the body of mercury L in the housing 11 and are preferably made of micarta. When the rods 150 and 159 are raised, as shown in Fig. 2, the mercury level is at A. The volumetric displacement of the auxiliary float ring 148 then is such that it produces a buoyant effect on the main float 45 equal to one pound plus K; whereas, the volumetric displacement of the auxiliary float ring 149 then is such that it produces a buoyant effect on the main float 45 of two pounds plus K.

It will be apparent that when the rod 150 is pushed downwardly to the extent permitted by the collar 170, the surface 156 of the member 153 will first engage with the beveled corner 155 of the auxiliary float ring 148 and force said ring deeper into the mercury L to an eventual depth where it is free from all possible engagement with the float portion 141, so that the ring 148 will be rendered incapable of exerting any buoyant force upon the main float 45. However, the liquid level will be raised to $A^2$ and the buoyant effect on the float 45 increased by K. It will also be apparent that when the rod 159 is likewise moved downwardly to the extent permitted by the collar 172, the surface 165 of the member 162 will first engage with the beveled surface 164 of the auxiliary float ring 149 and force it downwardly into the body of mercury L so that it likewise can exert no buoyant effect upon the main float 45. The liquid level will then be raised to A', thereby further supplementing the buoyant effect on the float 45 by K, so that with rods 150 and 159 down the total buoyant effect of said float is $(1 \text{ pound}-2K)+2K=1$ pound. The beveled surfaces on the members 153 and 162 control the positions of the auxiliary float rings 148 and 149 when the latter are not engaged with the main float 45, and hold the same in axial alignment with said main float, thereby making it impossible for said auxiliary float rings to inadvertently increase the buoyant effect of said main float.

With the foregoing in mind, it will be apparent that the capacity of the weighing machine can be widely varied for weighing different fixed loads of material, as follows:

(1) In order to weigh a load of one pound in the receiver 93, the displacement member 142 is maintained in its uppermost position and the rods 150 and 159 are locked in their down position by the wing bolts 168 and 169 so that the auxiliary float rings 148 and 149 are held submerged by the members 153 and 162 free from contact with the main float means 45 and the mercury level is then at A'. Under such conditions, the buoyant effect of the float is, as explained above, one pound.

(2) In order to increase the capacity of the weighing machine above one pound by any desired fractional increment, it is only necessary to maintain the rods 150 and 159 in their down position, as described in paragraph (1), supra, and to adjust the knurled nut 147 on the stem 143 to lower the displacement member 142 into the body of mercury L to a depth necessary to displace a volume of mercury equal to the fraction of a pound to be weighed. Assuming the stop pin 143ª limits the maximum displacement of the member 142 to one pound, the nut 147 can be manipulated to displace liquid to any bevel above A' to weigh any fixed load in the receiver 93 from one pound to two pounds. If the displacement member 142 is designed to effect displacement of slightly more than one pound of mercury then, of course, it need not be lowered to its maximum depth to enable two-pound loads to be weighed.

(3) In order to quickly adapt the machine to weigh two-pound loads of material without any adjustment of the displacement member 142, the displacement member 142 is maintained in its uppermost position and the rod 150 is raised until its collar 170 abuts the housing 19, thereby causing the mercury level to drop from A' to A² and reducing the buoyant effect of the main float to one pound minus K. The wing bolt 168 is then tightened to hold the rod 150 in raised position. The member 153 will then assume the position shown in Fig. 2, clear of the auxiliary float ring 148 so that the beveled portion 157 thereof can engage with the beveled portion 158 of the float portion 141 and thereby increase the buoyant effect of the main float 45 by its own buoyancy, which, it will be recalled, is equal to one pound plus K. The total buoyant effect of the floats 45 and 148 is equal to (1 pound−$K$)+(1 pound+$K$) or two pounds, so that successive loads of two pounds can be weighed in the receiver 93.

(4) With the rod 150 raised, as described in paragraph (3), supra, and the rod 159 holding float ring 149 out of contact with the float portion 141, displacement member 142 can be adjusted to vary the level of the liquid, as described in paragraph (2), supra, to thereby increase the buoyant effect of the liquid L on the main float 45 and auxiliary float 148 to any desired fractional amount above two pounds. The machine can then weigh predetermined loads from two pounds up to three pounds, depending upon the adjustment of the displacement member 142.

(5) In order to quickly adapt the machine to weigh three-pound loads of material without any adjustment of the displacement member 142, the displacement member 142 is maintained in its uppermost position, the rod 150 is lowered to disengage the auxiliary float ring 148 from the float portion 141 and locked in its lowermost position, and the rod 159 is raised to the position shown in Fig. 2 to permit the auxiliary float ring 149 to engage with the float portion 141 and supplement its buoyant effect. The mercury level will then be at A² and the buoyant effect of the float 45 will be one pound minus K. It will be recalled that the auxiliary float ring 149 has a buoyant effect equal to two pounds, plus K, so that when added to the one-pound minus K buoyant effect of the main float 45, the machine is set to handle three-pound loads.

(6) The capacity of the machine can be increased from three to four pounds by simply maintaining the rod 150 in its lowermost position and the rod 159 in its raised position, as described in paragraph (5), supra, and adjusting the displacement member 142 to vary the liquid level to a height corresponding to the desired fraction of a pound weight in excess of three pounds that it is desired to weigh in the receiver 93. Depending upon the adjustment of the displacement member 142, the machine will now handle predetermined loads ranging anywhere from three up to four pounds.

(7) In order to quickly set the machine for handling fixed loads of four pounds without any adjustment of the displacement member 142, it is only necessary to maintain the displacement member 142 in its uppermost position and to secure both rods 150 and 159 in their uppermost positions so that both auxiliary float rings 148 and 149 are engaged with the lower portion 141 of the main float 45 and supplement its buoyant effect. The liquid level will then be at A, as shown in Fig. 2. The float 45, under these conditions, has a buoyant effect of one pound minus 2K, and the rings 148 and 149 a combined buoyant effect of (1 pound+$K$)+(2 pounds+$K$) or three pounds plus 2K so that the total buoyant force to be overcome by the material deposited in the receiver 93 will then be (1 pound−$2K$)+(3 pounds+$2K$)

or four pounds.

(8) The capacity of the weighing machine can be varied to weigh fixed loads of anywhere from four to five pounds by maintaining the rods 150 and 159 in their fully raised positions so that the float rings 148 and 149 are engaged with the float portion 141, and then turning the nut 147 to adjust the displacement member 142 downwardly to produce the additional buoyant effect desired corresponding to the desired fraction of a pound to be weighed.

(9) If the machine is one in which the displacement member 142 is so designed that the engagement of the stop pin 143ᵃ with the plate 17 limits downward movement thereof to displace a maximum of one pound of mercury, then said machine can be quickly set to handle fixed loads of five pounds by maintaining the rods 150 and 159 in their fully raised positions, as described in paragraph (8), supra, and adjusting the displacement member 142 to its extreme lower position, whereupon the aggregate four-pound buoyant effect of the floats 45, 148 and 149 will be supplemented by an additional buoyant effect equal to one pound by the thus displaced mercury.

It will be understood that for any adjustment of the weighing machine within its capacity, the receiver 93 will remain in its raised position until the material deposited therein reaches the desired weight, whereupon the float means will be caused to gently move downwardly, thereby indicating that the desired weight has been made.

The use of mercury as the liquid medium in the weigher makes it possible to reduce the bulk of the entire machine and particularly the main float 45, and by virtue of the use of the auxiliary floats 148 and 149 it is possible to maintain the over-all length of the main float at a minimum. At the same time, the feature of providing the main float 45 and the auxiliary floats 148 and 149 of predetermined pound-unit displacement and rendering said auxiliary floats effective or ineffective at will, affords the highly desirable advantage of being able to quickly vary the weighing capacity of the machine from one given load in terms of pounds to another. The further feature of limiting the maximum displacement of the member 142 to one pound and providing for adjustment thereof for any fractional part of a pound, greatly increases the utility and versatility of the present weighing machine.

While one operative form of weighing machine embodying the principles of the invention has been disclosed herein, it will be understood that various changes may be made in the arrangement and details of construction of the machine without departing from the spirit of the invention or the scope of the annexed claims.

We claim:

1. A weighing machine, comprising: a container having a body of liquid therein; float means disposed in said container and buoyantly supported by said liquid; a receiver supported by said float means and adapted to receive material to be weighed; and auxiliary float means in said container engageable with said first-mentioned float means to increase the buoyant effect thereof.

2. A weighing machine, comprising: a container having a body of liquid therein; main float means disposed in said container and buoyantly supported by said liquid; a receiver supported by said main float means and adapted to receive material to be weighed; and a plurality of other float means submerged in said body of liquid and successively engageable with said main float means for progressively increasing the buoyant effect of said main float means.

3. A weighing machine, comprising: a container having a body of liquid therein; main float means disposed in said container and buoyantly supported by said liquid; a receiver supported by said main float means and adapted to receive material to be weighed; auxiliary float means in said container engageable with said main float means to increase the buoyant effect thereof; and a member operable to either maintain said auxiliary float means out of contact with said main float means or to allow said auxiliary float means to engage said main float means.

4. A weighing machine as defined in claim 3 including means for automatically centering the auxiliary float means with respect to the main float means.

5. A weighing machine as defined in claim 3 including means for automatically centering the auxiliary float means with respect to the member which engages the same to depress the same in the liquid.

6. A weighing machine, comprising: a container having a body of liquid therein; main float means disposed in said container and buoyantly supported by said liquid; means limiting upward movement of said main float means; means guiding said float means for vertical movement with respect to said container; a receiver supported by said main float means and adapted to receive material to be weighed; a displacement member in said container; means for vertically adjusting said displacement member in said container to vary the height of the liquid level therein and thus alter the weighing capacity of the machine; auxiliary float means in said liquid, said auxiliary float means being engageable with said main float means to increase the buoyant effect of said main float means to further vary the weighing capacity of the machine; and means including a member engageable with said auxiliary float means for depressing the same in said liquid to a depth out of contact with said main float means.

7. A weighing machine, comprising: a container having a body of liquid therein; main float means disposed in said container and buoyantly supported by said liquid; a receiver supported by said main float means and adapted to receive material to be weighed; and a plurality of auxiliary float members in said container, each adapted to engage said main float means to increase the buoyant effect thereof; and independently operable means engageable with each of said auxiliary float members actuatable to either maintain said auxiliary float members out of contact with said main float means, or to allow said auxiliary float members to engage with said main float means to increase the buoyant effect thereof.

8. A weighing machine as defined in claim 7, in which the auxiliary float members are of different volumetric displacement.

9. A weighing machine, comprising: a container having a body of liquid therein; float means disposed in said container and buoyantly supported by said liquid; means limiting upward movement of said main float means; a receiver supported by said float means and adapted to receive material to be weighed; a displacement member in said container; means for vertically adjusting said displacement member in said container to vary the height of the liquid level therein and thus alter the weighing capacity of the machine; and a plurality of auxiliary float members in said container, each adapted to engage said first-mentioned float means to increase the buoyant effect thereof; and independently operable means engageable with each of said auxiliary float members actuatable to either maintain said auxiliary float members out of contact with said first-mentioned float means, or to allow said auxiliary float members to engage with said first-mentioned float means to increase the buoyant effect thereof and thus further alter the weighing capacity of the machine.

10. A weighing machine, comprising: a container having a body of liquid therein; float means disposed in said container and buoyantly supported by said liquid; a receiver supported by said float means and adapted to receive material to be weighed, said float means including a cylindrical portion; a ring-shaped float in said liquid surrounding said cylindrical portion in spaced relation thereto and being selectively engageable therewith to increase the buoyant effect of said float means; and means for automatically centering said ring-shaped float on said cylindrical portion of said first-mentioned float means upon engagement of the former with the latter.

11. A weighing machine, comprising: a container having a body of liquid therein; float means disposed in said container and buoyantly supported by said liquid; a receiver supported by said float means and adapted to receive material to be weighed; a submerged ring-shaped float surrounding said first-mentioned float means; a rod slidably mounted in said container; a member secured to said rod above said ring-shaped float and being engageable with said ring-shaped float, said rod being slidable downwardly to a position to further submerge said ring-shaped float to a depth such that it is out of contact with said first-mentioned float means; and means for securing said rod in said position.

12. A weighing machine as defined in claim 11, including means limiting the maximum downward movement of the slidable rod to a predetermined amount.

13. A weighing machine, comprising: a container; a body of mercury in said container having a predetermined normal level; main float means disposed in said container and buoyantly supported by said body of mercury; means guiding said float means for vertical movement in said container; a receiver supported by said float means and adapted to receive material to be weighed; a pair of auxiliary floats in said body of mercury, each of said auxiliary floats being engageable with said main float means to increase the buoyant effect of said main float means; and means including a member selectively engageable with the respective auxiliary floats for independently depressing the same in said body of mercury to a depth at which they are out of contact with said main float means.

14. A weighing machine as defined in claim 13, in which the main float means has a buoyant effect of one pound.

15. A weighing machine as defined in claim 13, in which one of the auxiliary floats has a volumetric displacement of such value as to increase the buoyant effect of the main float by one pound when engaged therewith.

16. A weighing machine as defined in claim 13, in which one of the auxiliary floats has a volumetric displacement of such value as to increase the buoyant effect of the main float by two pounds when engaged therewith.

17. A weighing machine as defined in claim 13, including a displacement member in the container having its lower end extending into the body of mercury; means limiting upward movement of said main float means; means for vertically adjusting said displacement member in said container to vary the height of the mercury level therein to thus alter the weighing capacity of the machine; and means for limiting the maximum extent to which said displacement member can be lowered into said body of mercury to a depth such as will increase the buoyant effect of the main float means by one pound.

18. A weighing machine, comprising: a cylindrical container having a body of liquid therein; float means disposed in said container and buoyantly supported by said liquid; means limiting upward movement of said main float means; means guiding said float means for vertical movement in said container; a receiver supported by said float means adapted to receive material to be weighed; an annular displacement member disposed in the upper portion of said container in sliding contact with the interior thereof; and means for vertically adjusting said displacement member in said container to vary the height of the liquid level therein and thus alter the weighing capacity of the machine.

19. A weighing machine, comprising: a generally cylindrical container having a body of liquid therein; float means disposed in said container and buoyantly supported by said liquid; means limiting upward movement of said main float means; means guiding said float means for vertical movement in a direction axially of said container; a receiver supported by said float means and adapted to receive material to be weighed; an annular displacement member in said container disposed in surrounding relation to said float means; and means for vertically adjusting said displacement member in said container to vary the height of the liquid level therein and thus alter the weighing capacity of the machine.

20. A weighing machine, comprising: a container having a body of liquid therein; float means disposed in said container and buoyantly supported by said liquid; means guiding said float means for vertical movement with respect to said container, said guide means comprising a generally T-shaped guide member carried by the upper portion of said float means, said guide member having pairs of surfaces on its head and stem disposed in vertical planes perpendicular to each other, and a pair of anti-friction rollers engaged with the outer vertical surface of the head of the T, and an anti-friction roller engaged with the vertical surfaces of the sides and end of the stem of the T; and a receiver supported by said float means and adapted to receive material to be weighed.

21. A weighing machine, comprising: a container having a body of liquid therein; float means disposed in said container and buoyantly supported by said liquid; means guiding said float means for vertical movement with respect to said container; a receiver supported by said float means and adapted to receive material to be weighed, said float means including a generally cylindrical portion having zones of different outside diameters; a pair of ring-shaped floats in said liquid surrounding said zones in spaced relation thereto and being selectively engageable therewith to increase the buoyant effect of said float means; means for automatically centering said ring-shaped floats on said zones of said cylindrical portion of said float means upon engagement of the former with the latter; and means for selectively depressing said ring-shaped floats in said liquid to a depth at which they are out of contact with said float means.

22. A weighing machine, comprising: a container having a body of liquid therein; float means disposed in said container and buoyantly supported by said liquid; means guiding said float means for vertical movement with respect to said container; a receiver supported by said float means and adapted to receive material to be weighed, said float means having a shoulder formed on the exterior thereof; a ring-shaped float in said liquid surrounding said float means and being engageable with said shoulder to increase the buoyant effect of said float means; and means for optionally depressing said ring-shaped float in said liquid to a depth at which it is out of contact with said float means.

23. A weighing machine, comprising: a container having a body of liquid therein; float means disposed in said container and buoyantly supported by said liquid; means guiding said float means for vertical movement with respect to said container; a receiver supported by said float means and adapted to receive material to be weighed, said float means having axially spaced inverted conical zones of different diameters; a pair of ring-shaped floats of different internal diameter disposed in said liquid, said ring-shaped floats having beveled upper inner edges individually complementary to said conical zones and being selectively engageable therewith to increase the buoyant effect of said float means; and means for selectively depressing said ring-shaped floats in said liquid to a depth at which they are out of contact with said float means.

SIGMUND RAPPAPORT.
JAMES C. PETREA.

REFERENCES CITED

The following references are of record in the file of this patent:

UNITED STATES PATENTS

| Number | Name | Date |
| --- | --- | --- |
| 232,245 | Deschamps | Sept. 14, 1880 |
| 403,452 | Batter | May 14, 1889 |
| 1,344,663 | Waldrep | June 29, 1920 |
| 1,425,466 | Frame | Aug. 8, 1922 |
| 2,300,282 | Eash | Oct. 27, 1942 |
| 2,462,216 | Nowak | Feb. 22, 1949 |
| 2,487,664 | Morgan | Nov. 8, 1949 |